United States Patent

[11] 3,533,398

| [72] | Inventor | William C. Jones<br>16 W. 328 Walnut Lane, Timber Trails,<br>Elmhurst, Illinois 60126 |
|---|---|---|
| [21] | Appl. No. | 739,001 |
| [22] | Filed | June 21, 1968 |
| [45] | Patented | Oct. 13, 1970 |

[54] PULMONARY MONITORING APPARATUS
15 Claims, 12 Drawing Figs.

[52] U.S. Cl. .................................................. 128/2,
128/2.07, 128/2.08
[51] Int. Cl. .................................................. A61b 5/10,
A61b 5/00, A61b 5/08
[50] Field of Search .......................................... 128/2, 2.06,
2.07, 2.08, 2.05, 145, 145.1, 145.5, 145.6, 145.7,
145.8, 28, 30, 30.2, 188, 202, 204

[56] References Cited
UNITED STATES PATENTS

| 2,263,844 | 11/1941 | Hammond | 128/30 |
| 2,831,181 | 4/1958 | Warner | 128/2 |
| 2,924,218 | 2/1960 | Goodner | 128/145.6 |
| 3,311,109 | 3/1967 | Gruen et al. | 128/2.08 |
| 3,313,295 | 4/1967 | Robinson | 128/30 |
| 3,347,222 | 10/1967 | Kohrer | 128/2 |
| 3,420,225 | 1/1969 | Holden et al. | 128/2.08 |

Primary Examiner—Charles F. Rosenbaum
Assistant Examiner—John B. Mitchell
Attorney—Dawson, Tilton, Fallon and Lungmus ABSTRACT: An apparatus for accurately monitoring a patient's ventilation over a period of time or for monitoring the pressure required to fill the patient's lungs. The apparatus includes a pair of reciprocating bellows operatively connected to each other so that each bellows contracts as the other expands, and an air-intake tube adapted to be connected to the lungs of the patient to be monitored, either through the mouth or through a tracheotomy. Valve means are interposed between the air-intake tube and the bellows and selectively direct air from the air-intake tube into one or the other of the bellows. The valve means is activated by a switch which is opened or closed as each of the bellows reaches its fully expanded condition. Recording means translate the reciprocal movement of the bellows into unidirectional movement which is recorded on a chart.

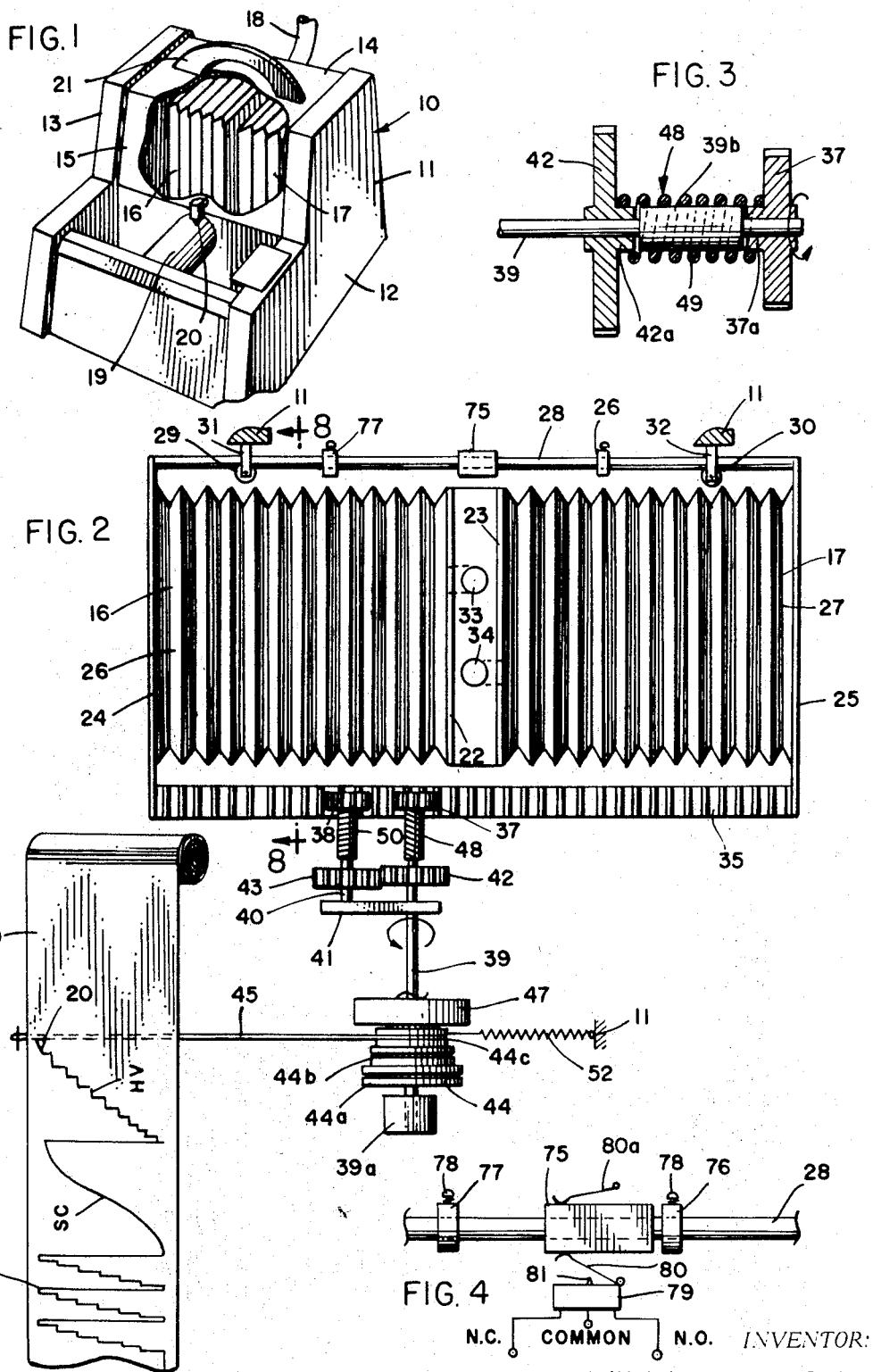

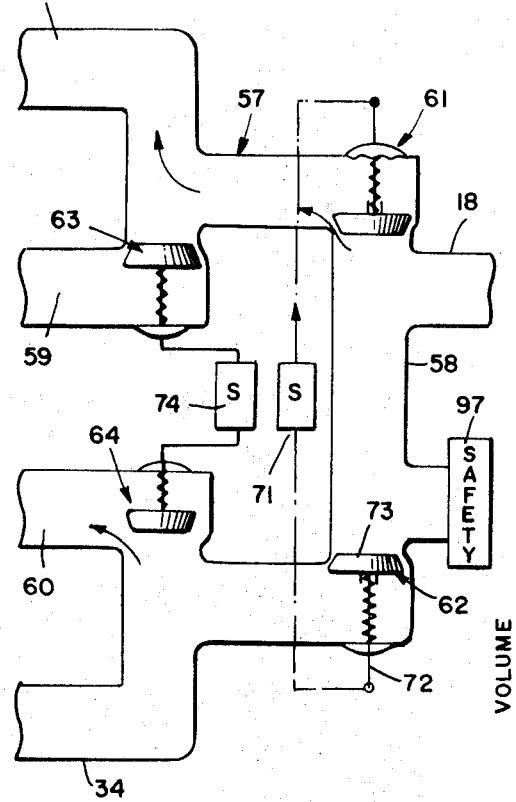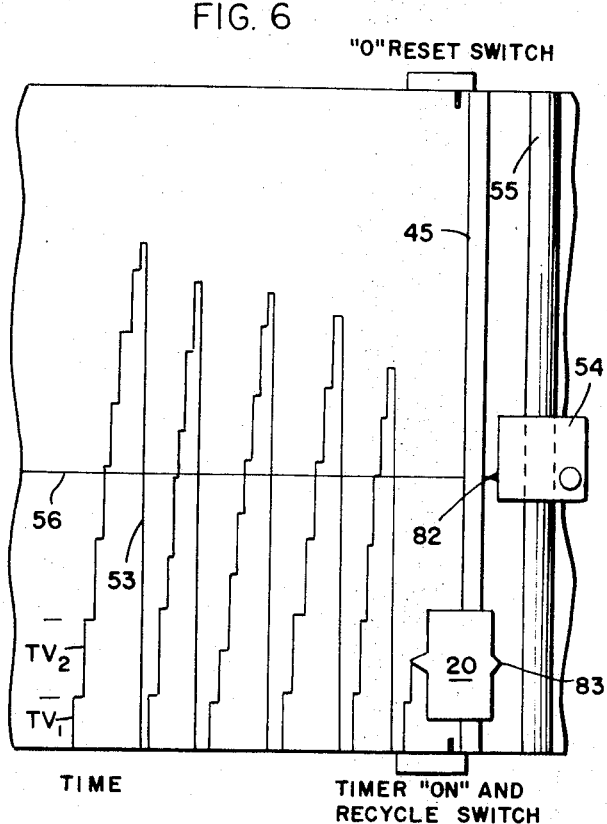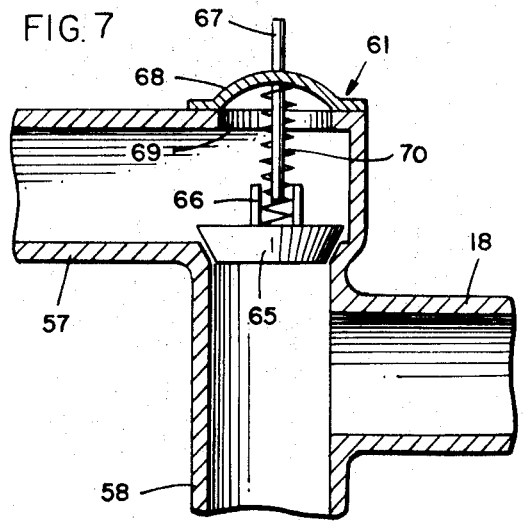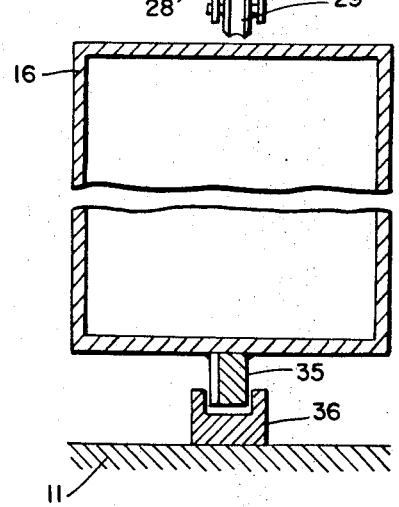

INVENTOR:
WILLIAM C. JONES
BY
Dawson, Tilton, Fallon & Lungmus
ATT'YS

PULMONARY MONITORING APPARATUS

BACKGROUND

It is often desirable to monitor a patient's breathing, and this is particularly true for patients who have respiratory failure or who cannot breathe by themselves. These patients sometimes give the appearance of normal breathing, but the frequency of their breathing may gradually deteriorate from a normal of about 10 to 15 breaths per minute to, say, 6 or 8 breaths per minute. This gradual frequency deterioration is not very noticeable, and, since the patient would be getting insufficient ventilation at a low frequency, this unnoticed deterioration may be harmful.

Even if the breathing frequency remains relatively constant, the patient's tidal volume may deteriorate. The tidal volume is the volume of gas inspired or expired during each normal respiratory cycle. A normal patient's tidal volume may be about 1.7 liters, and the sum of tidal volumes over a period of a minute may be 15 to 20 liters. If only individual tidal volumes were being measured, it might be difficult to detect a gradual deterioration of the total gas inspired and expired over a period of time.

Monitoring means are presently available which record each breath or record each tidal volume. However, these machines have certain shortcomings. A patient's ventilation is determined by both the breathing frequency and the volume inspired and expired with each breath. It is preferable to take recordings over a minute or other period of time longer than one cycle so that variables can be averaged out and a more accurate determination of ventilation can be obtained. However, a patient's minute ventilation may be as much as 15 to 20 liters of gas, that is, the volume of gas expired by a patient over 1 minute would amount to 15 to 20 liters. Heretofore, if a machine were to measure minute ventilation, a relatively large volume of the order of 20 liters would be needed to collect the expired air. A monitoring apparatus with such a large expired air collector would be bulky, difficult to maneuver, and occupy important space.

It is also desirable to obtain the compliance of a patient, that is, the amount of volume that can be introduced into the lungs per unit pressure. A patient who has difficulty breathing by himself may be connected to a ventilator, which is essentially a pump which forces air into the patient's lungs. However, the patient's lungs may fill with fluid, and more pressure is required to obtain the same volume of inspiration. In other words, the portion of the lungs which does not contain the fluid would have to be expanded more. It is desirable to measure the pressure needed for each breathing cycle, and this pressure might vary from, say, 20 centimeters of water to 60 centimeters of water.

By measuring both the compliance and the ventilation, the technician can observe if an increase in pressure occurs while ventilation decreases, which indicates that something is wrong, for example, fluid in the lungs, a leak between the patient and the ventilator, and the like.

SUMMARY

The inventive apparatus provides a closed circuit system which gives a continuous reading of either ventilation or pressure. The apparatus can record actual ventilation over a period of a minute or a much longer period, and the apparatus is extremely compact and light and may readily be moved from place to place. The apparatus includes a pair of relatively small-volume reciprocating bellows which alternately expand and contract and a recording shaft which is continuously turned in the same direction regardless of the direction of movement of the bellows. The rotation of the shaft is translated into linear movement which is scribed on a recording chart. The volume expired over a minute, hour, day, or other period of time can thereby be accurately measured.

DESCRIPTION OF THE DRAWING

The invention is explained in conjunction with an illustrative embodiment shown in the accompanying drawing:

FIG. 1 is a perspective view of the monitoring apparatus;
FIG. 2 is a schematic diagram of the monitoring apparatus;
FIG. 3 is an enlarged fragmentary view partially in section of the clutch means;
FIG. 4 is a fragmentary view of the switch means;
FIG. 5 is a schematic view of the valve means;
FIG. 6 is a view of the recording chart;
FIG. 7 is an enlarged fragmentary view of a portion of FIG. 5;
FIG. 8 is a sectional view taken along the line 8-8 of FIG. 2.

DESCRIPTION OF SPECIFIC EMBODIMENT

Figure 9:
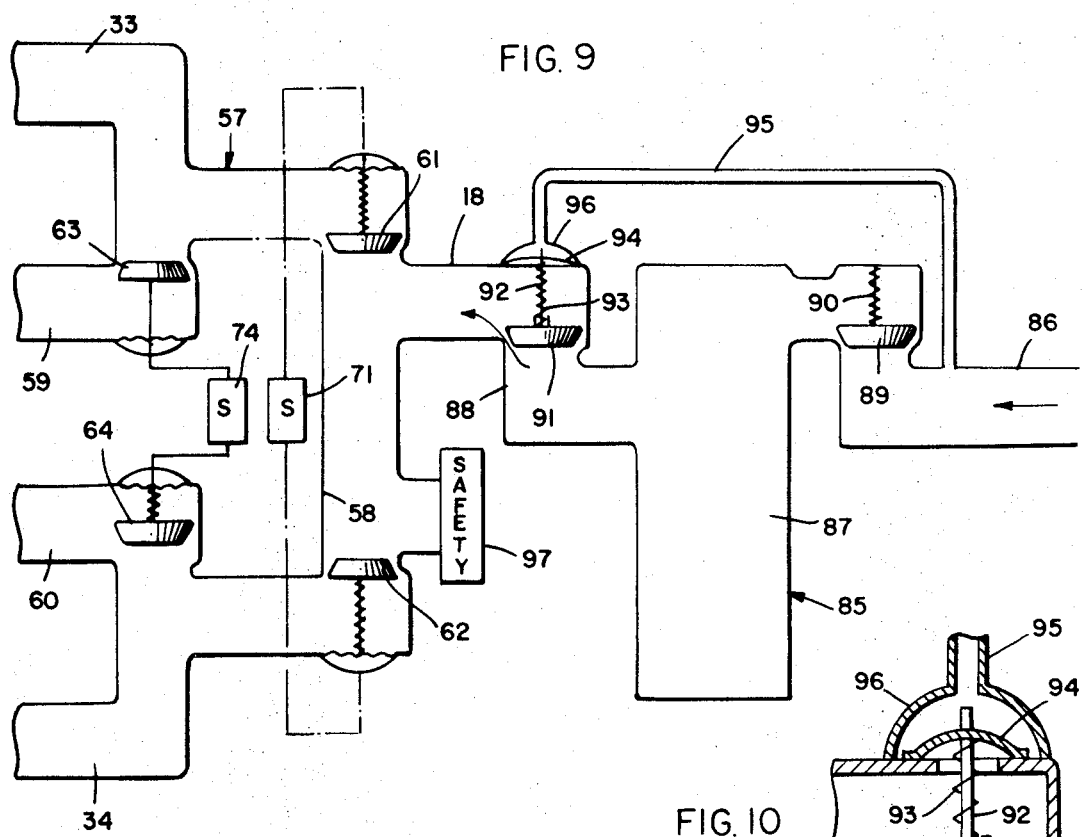
FIG. 9 is a view similar to FIG. 5 showing the valve means used when monitoring pressure.

Referring to FIG. 1, the numeral 10 designates generally the monitoring apparatus which includes an outer casing or frame 11 having side walls 12 and 13, top wall 14, front wall 15, and a rear wall (not shown), which provide an interior bellows chamber. A pair of reciprocating bellows 16 and 17 are mounted within the casing and communicate with the lungs of the patient to be monitored by means of air intake tube 18. The casing 11 also carries a suitable recording chart 19 which is inscribed by stylus 20 operatively connected to the bellows. If desired, a handle 21 is secured to the top wall 14 for transporting the monitoring apparatus.

Referring to FIG. 2, each bellows 16 and 17 is mounted within the casing for horizontal expansion and contraction and includes a fixed end plate 22 and 23, respectively, and a movable end plate 24 and 25, respectively. The end plates may advantageously be made of lightweight metal, such as aluminum. Bellows 16 includes an accordion-pleated body 26 formed of rubber or any other suitable nonporous and flexible sheet material which is sealingly attached to end plates 22 and 24, and bellows 17 includes a similar accordion body 27.

The generally rectangular fixed end plates 22 and 23 are suitably secured to the casing 11 in spaced-apart parallel planes, and the movable end plates 24 and 25 are supported for movement toward and away from the respective fixed end plate of each bellows by support rod 28. The elongated support rod is attached to each of the movable end plates and is slidably supported by a pair of grooved rollers or pulleys 29 and 30 which are rotatably carried by U-brackets 31 and 32 secured to the casing 11 (see also FIG. 8).

An air intake conduit 33 extends through the fixed end plate 22 of bellows 16, and, similarly, air intake conduit 34 extends through fixed end plate 23 of bellows 17. Valve means to be described more fully hereinafter directs air into one of the air intake conduits 33 and 34 to expand one or the other of the bellows. For example, if air is directed into air intake conduit 33, the bellows 16 expands and the movable end plate 24 moves to the left as shown in FIG. 2. The rod 28 moves with the end plate 24, causing end plate 25 to move to the left to contract the bellows 17 and force air from the bellows through air conduit 34. Similarly, if air is directed into air intake conduit 34, the end plate 25 and the end plate 24 move to the right, expanding bellows 17 and contracting bellows 16. Each of the bellows 16 and 17 may expand to a volume of about 3 to 3½ liters, and the casing 11 may thereby be made relatively compact, each bellows occupying about 1½ to 2 liters in the neutral position illustrated in FIG. 2.

A geared rack 35 is carried below the bellows and is secured to each of the movable end plates 24 and 25 for movement therewith. The rack 35 thus reciprocates as first one bellows and then the other expands. If desired, a guide channel 36 (FIG. 8) may be secured to the casing 11 to ensure that each of the movable end plates is maintained generally parallel with its associated fixed end plate.

A pair of pinion gears 37 and 38 engage the rack 35 and are rotated by linear movement of the rack. The pinion 37 is carried by main shaft 39 which is suitably journaled in the casing 11 for rotational movement, as by bushing 39a. Similarly, pinion 38 is carried by shaft 40 which is rotatably supported a fixed distance from shaft 39, as by bushing 41. Each of the shafts 39 and 40 carry a gear 42 and 43, respectively, which mesh with each other.

The shaft 39 also carries one or more grooved pulleys 44, and an elastic drive band 45 is wrapped about one of the pulleys and carries a stylus 20 which scribes the recording chart 19. The other end of the looped drive band 45 is suitably rotatably supported as by a roller (not shown). As the shaft 39 rotates, the band 45, which frictionally engages one of the pulleys 44, causes linear movement of the stylus 20 which is recorded on the chart 19.

The pulleys 44 may be operatively disconnected from the shaft 39 by electric solenoid clutch 47. Any suitable clutch is satisfactory. For example, the clutch may force the pulleys 44 against an abutment or shoulder on the shaft 39, thereby frictionally engaging the pulleys for rotation with the shaft 39. Alternatively, the pulleys 44 may be carried by a separate shaft aligned with shaft 39, and the clutch 47 may be adapted to engage the pulley shaft for rotation with shaft 39. Other clutch means may be envisioned.

In a stationary condition, the pinion 37 is somewhat loosely carried by the shaft 39, and the shaft is provided with suitable clutch means 48 for connecting the shaft to the pinion when the pinion rotates in one direction and for disconnecting the shaft when the pinion rotates in the other direction. One such type of clutch means is illustrated in FIG. 3. The pinion 37 is rotatably carried by shaft 39, and the gear 42 is fixed to the shaft for rotation therewith, as by a pin or spline connection. Each of the gears 37 and 42 are provided with a central hub 37a and 42a, respectively, and the shaft 39 is provided with a radially enlarged portion 39b between the gears 37 and 42 having a diameter equal to the outside diameters of the hubs 37a and 42a. A helical spring 49 is carried by the enlarged portion 39b of the shaft, and the ends of the spring extend over the hubs 37a and 42a. In its neutral or unflexed state, the spring 49 rides loosely on the shaft 39, and if the pinion 37 is rotated in the direction of the arrow in FIG. 3, the spring 49 will be tended to be wound in a direction which will loosen the coils of the spring around the hub 37a. The pinion 37 will therefore rotate about the shaft 39, and will not cause rotation of the shaft. However, if the pinion 37 rotates in the opposite direction, the coils of the spring 49 will tighten about the hub 37a and the enlarged portion 39b of the shaft, and the shaft will rotate with the pinion. It is to be understood that other suitable clutch means for operatively connecting and disconnecting the pinion 37 with the shaft 39 may be used.

Similarly, the shaft 40 carries suitable clutch means 50 such as a helical spring between the pinion 38 and the gear 43. One of the gears 38 and 43 is fixed to shaft 40, while the other is rotatably carried by the shaft 40 when the spring 50 is in the neutral condition.

The springs 49 and 50 are wound in the opposite direction so that one spring is tightened and the other loosened when the rack 35 moves in one direction and one spring is loosened and the other tightened when the rack moves in the other direction. For example, if the spring 49 is tightened when the rack moves to the right in FIG. 2, the pinion 37 will be operatively connected to the shaft 39, and the shaft 39 will rotate in the direction of the arrow in FIG. 2. The spring 50 is loosened when the rack moves to the right, and the gear 43 is therefore operatively disconnected from the pinion 38. If the rack moves to the left, the spring 49 is loosened and the shaft 39 is not driven by the pinion 37. The spring 50 is tightened and the pinion 38 causes the gear 43 to rotate. By virtue of the intermeshing gears 42 and 43, the main shaft 39 is again rotated in the direction of the arrow. Thus, regardless of whether the rack 35 moves to the right or left, the main shaft 39 will always rotate in the same direction and provide unidirectional movement to the stylus 20.

If air is directed into bellows 16, the end plate 24 and rack 35 move to the left, and the distance of movement is a measure of the volume which the bellows expands. The linear movement of the rack 35 is recorded by the stylus 20, and the recording chart 19 may be suitably calibrated to provide volumetric readings. When the bellows 16 approaches its fully expanded condition, suitable switching means to be described more fully hereinafter cause the air expired by the patient to be directed into the bellows 17. The direction of the movement of the rack 35 reverses, and the bellows 17 expands while the bellows 16 contracts. However, even though the direction of movement of the rack has been reversed, the stylus continues to move in the same direction, providing an accummulated and continuous reading of the volume of air expired by the patient.

The movement of the stylus 20 over the recording chart 19 is illustrated in FIG. 6, in which time is plotted on the horizontal axis and volume on the vertical axis. The patient's first expiration after he is connected to the machine is indicated by the generally vertical line designated $TV_1$, or tidal volume one, and the second expiration is indicated by the generally vertical line $TV_2$, or tidal volume two. The generally horizontal line connecting the lines $TV_1$ and $TV_2$ indicate an inspiration, and the bellows 16 and 17 neither expand nor contract during this period.

The stylus 20 will continue to record the accummulated volumes of expiration until a desired time period is reached, for example, 1 minute, or 1 hour. After this predetermined period of time, a suitable time delay relay disengages the clutch 47 carried by the shaft 39, and a rewind spring 52 (FIG. 2), which was being wound about the rotating shaft 39 or one of the pulleys 44, causes the pulleys 44 to quickly rotate in the reverse direction, causing the stylus 20 to snap back to its original position along the vertical axis. This movement of the stylus is indicated by the vertical line 53 on the graph in FIG. 6.

The height of the peaks inscribed on the recording chart 19 in FIG. 6 indicate the total volume of air expired by the patient during the time period selected. The total volume expired during each time period is seen to be gradually decreasing, and this gradual decrease is made much more readily observable by the inventive apparatus than would be possible with a monitoring apparatus which would begin a new cycle for each expiration of the patient, as an individual expiration volume may vary, for several reasons, oppositely to the person's ventilation over a period of time.

If desired, a second stylus 54 may be provided which rides on rod 55 which is suitably secured to the casing 11. This stylus may be set at a position along the vertical axis which would correspond to the ventilation level which the physician determines would be the minimum safe ventilation. The recording chart 19 is being moved to the left by a suitable revolving drum or roller, and the monitoring stylus 54 scribes a horizontal line 56 on the chart. When the ventilation peaks do not rise above the line 56, the technician knows that the patient's ventilation is below the safe level and notifies the physician.

The valve means used to direct the expired air into one or the other bellows 16 or 17 will now be described. Referring to FIGS. 5 and 7, the air intake tube 18 which is connected to the patient communicates with a valve manifold designated generally by the numeral 57. The manifold 57 includes a cross pipe 58 which joins the air intake conduit 33 and the air intake conduit 34. The conduit 33 is provided with an exhaust port 59, and the conduit 34 is provided with exhaust port 60. Valve assemblies 61 and 62 are positioned at the juncture between cross pipe 58 and the intake conduits 33 and 34, respectively, and valve assemblies 63 and 64 are positioned at the junction of the exhaust ports 59 and 60 and their respective conduits.

Referring to FIG. 7, the valve assembly 61 includes a frustoconical valve member 65 which is adapted to engage a correspondingly shaped seat in the valve manifold 57. The valve member 65 includes a generally cylindrical collar 66 which receives an elongated shaft 67. The shaft 67 passes through a flexible diaphragm 68 which is secured to the manifold 57 and closes an opening 69 provided therein. The shaft 67 and the diaphragm 68 are sealingly engaged, and the flexible diaphragm permits the shaft to be moved longitudinally without causing a leak in the manifold. A spirally wound spring 70 is carried by the shaft 67 and applies a slight positive force against the valve 65 to position the valve within its seat. The shaft 67 is operatively connected to an electrical solenoid 71 which may cause the shaft to reciprocate longitudinally from the position shown in FIG. 7 to a position abutting the valve member 65 to firmly seat the valve member and seal the cross pipe 58 from the intake conduit 33. However, when the shaft is spaced from the valve member 65 as shown, the pressure of the patient's expiration will unseat the valve 65 and the expired air will enter the bellows 16 through the air intake conduit 33. When the patient inspires, the spring 70 will cause the valve member 65 to reseat, thereby maintaining the expired air within bellows 16. With each expiration, additional air is forced into bellows 16, and the bellows continuously expands.

Referring to FIG. 5, when the valve assembly 61 is maintained in the "soft" condition, that is, when the shaft 67 is spaced from the valve member, the valve assembly 62 is maintained in the "hard" condition, i.e., shaft 72 of the valve assembly 62 firmly seats valve member 73 and seals the cross pipe 58 from the intake conduit 34.

Valves 63 and 64 are similarly constructed, and solenoid 74 maintains the exhaust valve 63 in the hard or closed position when the valve 61 is in the soft condition, and maintains the valve 63 in the soft condition when the valve 61 is in the hard condition. Similarly, the valve 64 is in the soft condition when valve 62 is in the hard condition and in the hard condition when the valve 62 is in the soft condition. Thus, expired air from the patient passes the valve 61 and enters bellows 16 through intake conduit 33, thereby expanding the bellows 16. Since the movable end plates 24 and 25 of the bellows are connected by the rod 28 and rack 35, the bellows 17 contracts as the bellows 16 expands. The air forced from the bellows 17 during contraction is allowed to pass the exhaust valve 64 and is exhausted through exhaust port 60.

When the bellows 16 approaches its maximum volume or limit of expansion, switching means activates the solenoids 71 and 74 which cause the conditions of the valves to reverse. That is, the valves 61 and 64 are switched from the soft to the hard condition, and the valves 62 and 63 are switched from the hard to the soft condition. Thereafter, the expired air passes through the intake conduit 34 into the bellows 17, the bellows 17 begins to expand and the linear movement of the rack 35 reverses. As the bellows 17 expands, the air forced from the contracting bellows 16 passes by the exhaust valve 63 and through the exhaust port 59.

A suitable switching means for operating the valves is illustrated in FIG. 4. The rod 28 which is connected to the movable end plates of the bellows slidably carries a cylindrical metal sleeve 75 between a pair of annularly shaped collars or washers 76 and 77. The collars 76 and 77 are fixed to the rod 28 at predetermined positions therealong by set screws 78. An electrical switch 79 is carried by the casing adjacent the rod 28 and includes a feeler arm 80 and a contact 81. If desired, a second feeler arm 80a may be positioned above the rod 28. The position of the resilient feeler arm 80 and the contact 81 are such that when the sleeve 75 does not contact the feeler arm, the feeler arm does not contact the contact 81, and the switch is open. In this position, the solenoids 71 and 74 are not energized, and the expired air passes into the bellows 16. As the bellows 16 expands and the rod 28 moves to the left in FIGS. 2 and 4, the collar 76 will eventually contact the sleeve 75 which rides on the rod 28 and force the sleeve into contact with the feeler arm 80. The switch will then be closed, activating the solenoids which reverse the positions of the valves in the valve manifold 57. The expired air will then be directed into the bellows 17, and the rod 28 will begin moving to the right. The switch will remain closed until the collar 77 pushes the sleeve 75 out of contact with the feeler arm 80, at which time the switch will open, the solenoids will be deenergized, and the positions of the valves will again be reversed. The position of the collar 76 may be set to correspond to the maximum limit of expansion of the bellows 16, and the position of collar 77 may be set to correspond to the maximum expanded position of the bellows 17.

Regardless of which bellows is collecting the expired air, the recording means of the monitoring apparatus provides a continuous reading. Further, even if a bellows reaches its maximum expansion in the middle of an expiration, causing the position of the valves to reverse, the remainder of the expired air is immediately directed into the contracted bellows. There is therefore no danger that the patient will be breathing into a closed volume which will interfere with his breathing. Heretofore, many of the monitoring devices had a fixed maximum collection volume, and when that volume was reached, the patient could no longer expire, or could do so only with great difficulty. Other monitoring devices include some sort of switching mechanism to eliminate this hazard, but the switching mechanism could be safely activated only during the time between expirations.

Referring again to FIG. 2, the main shaft 39 is seen to carry a plurality of pulleys 44 of varying diameters. This permits the rate of linear movement of the stylus 20 with respect to the rate or rotation of the shaft 39 to be varied, depending upon the ventilation time period desired. Accordingly, ventilation over both short and long periods of time to be recorded on the same sized recording charts. The large diameter pulley 44a may be used to monitor ventilation over a relatively short period of time, for example, 1 second; the pulley 44b may be used to monitor ventilation over 1 minute; and the pulley 44c may be used to monitor ventilation over 1 hour. The drive band 45 in FIG. 2 is looped about pulley 44c, and hour ventilation is being recorded on the recording chart 19 as at HV. If the drive band 45 were wrapped about the somewhat larger pulley 44b, the stylus 20 would move faster per unit period of time, and minute ventilation would be recorded as at MV. If the drive band 45 were wrapped about the even larger pulley 44a, the stylus 20 would move still faster per unit period of time, and second ventilation would be recorded as at SC. The SC graph is noticeably rounded, as the recording chart 19 is moving transversely with respect to the drive band 45 as the stylus 20 travels across the chart. The speed at which the recording chart 19 moves is also varied depending upon the ventilation period. For example, the chart may move at the rate of 6 inches per hour when recording hour ventilation, at the rate of one-half inch per minute when recording minute ventilation, and at the rate of 1 inch per second when recording second ventilaton. Since no novelty is claimed for the chart 19 and the drive motor therefor, which are well known in the art, a detailed description of these parts is not believed necessary.

The time delay relay circuit connected to the clutch 47 would be set depending upon the monitoring period. For example, if hour ventilation was being monitored, the clutch 47 would be disengaged every hour, and the rewind spring 52 would return the stylus 20 to the starting position. If minute ventilation were being recorded, the stylus 20 would be allowed to snap back to its original position every minute.

Referring to FIG. 6 the monitor stylus 54, which scribes the line corresponding to the selected minimum desirable ventilation level, may also be provided with an on-off switch 82 as part of a circuit electrically connected to the time delay relay circuit which operates the clutch 47. The stylus 20 is provided with a projection 83 which contacts the switch 82 each time the stylus 20 passes the minimum ventilation line 56, that is, when the patient's ventilation rises above the minimum safe level. The projection 83 opens the switch 82 as it passes above the line 56 and closes the switch when the stylus 20 is pulled back by the rewind spring 52. If the switch 82 is not opened before the time delay relay circuit disengages the clutch 47 to return the stylus 20 to its starting position, a suitable signal, such as a buzzer or flashing light, will be activated to indicate to the technician that the patient's ventilation has fallen below the minimum safe level, and the technician will be alerted to call the attending physician. If the switch 82 is opened before the clutch is disengaged, the signal will not be energized. It is believed that such an electrical circuit is well known in the art, and the circuit need not be explained in detail herein. Even if the signal is energized, the apparatus will continue monitoring the patient. When the physician arrives, a glance at the chart will enable him to determine how long the patient has not been ventilating properly. This not only aids in deciding the treatment to be given, but provides a check on the technician. If a long period has elapsed between the time the signal was activated and the time the physician was notified, the technician has been remiss.

Figure 10:
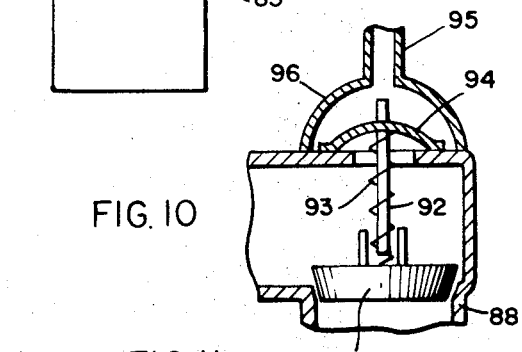
FIG. 10 is an enlarged fragmentary sectional view of a portion of FIG. 9.
Figure 11:
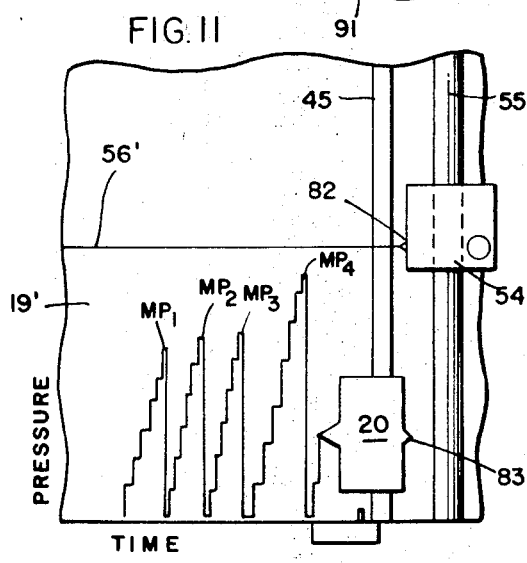
FIG. 11 is a view of the recording chart for monitoring pressure.

Referring now to FIGS. 9—11, the inventive monitoring apparatus may also be used to monitor the pressure used by a ventilator to ventilate a patient. The intake tube 18 of the monitor 10, rather than being connected to the patient's lungs, is connected to a pressure intake manifold designated generally by the number 85. The manifold 85 includes a pressure inlet tube 86, a chamber 87, and an outlet tube 88 which connects to the intake tube 18 of the monitor. Interposed in the intake tube 86 is a valve 89 similar to the valves 61 and 62 heretofore described, but the valve 89 is always maintained in the "soft" condition by the slight positive pressure of spring 90. Valve 91 (FIGS. 9 and 10) is interposed in the outlet conduit 88 and includes a shaft 92 which carries spring 93 and extends through diaphragm 94. Pressure-equalizing tube 95 extends from the inlet tube 86 and terminates in a chamber-providing dome 96 which covers the diaphragm 94.

The pressure inlet tube 86 communicates with the ventilator which is connected to the patient to force oxygen into the lungs, and the pressure in the pressure inlet tube 86 is therefore equal to the pressure required to ventilate the patient. This pressurized air passes by valve 89 into chamber 87. However, an equal pressure is maintained in the pressure-equalizing tube 95, thereby depressing the diaphragm 94 and the shaft 92 to close the valve 91. During the expiration portion of the cycle of the ventilator, the ventilator is not pumping and the patient is allowed to expire. The pressurized air in the chamber 87 cannot flow past the valve 89 back into the inlet tube 86, but, since the pressure-equalizing tube 95 and the diaphragm 94 are no longer pressurized, the pressurized air may flow past the valve 91 into the intake conduit 18 of the monitor 10. The volume of air passing into the intake conduit 18 is a measure of the pressure that was exerted in the chamber 87 by the ventilator, and this volume is directed into either bellows 16 or bellows 17 of the monitor as described hereinbefore.

The stylus 20 similarly records the movement of the bellows on the recording chart 19' illustrated in FIG. 11. The time delay relay circuit may again be set to disengage the clutch 47 at periodic intervals, and the maximum movement of the stylus along the vertical axis corresponds to the pressure required to ventilate the patient for the period of time selected. For example, a patient may require a pressure of 20 centimeters of water for one inspiration, a pressure of 30 centimeters of water for the next inspiration, and a pressure of 25 centimeters of water for the following inspiration. If only individual inspirations were measured, a gradual increase or decrease in the pressure over a period of time would be difficult to determine. However, by measuring minute pressure or hour pressure, that is the sum of the pressures needed for each inspiration over 1 minute or over 1 hour, the ventilation pressure may be much more easily monitored.

The monitor stylus 54 may be set by the physician to inscribe a line 56' corresponding to the maximum desired pressure level for a particular period of time, and when the recorded pressure for that period passes the line 56', the technician will be alerted to notify the physician. The chart 19' illustrated in FIG. 11 is recording minute pressure, and the total pressure required to ventilate the patient each minute, indicated by the peaks $MP_1$, $MP_2$, $MP_3$, $MP_4$, etc. seen to be gradually approaching the maximum pressure level. A signaling circuit similar to that heretofore described may be connected to the switch 82 carried by the monitor stylus 54, except that the signaling device is activated only if the switch 82 is closed during a cycle, that is, the stylus 20 passes the line 56'.

An increase in the minute pressure will generally indicate a problem with the patient, for example, the patient's lungs may be filling with fluid or becoming somewhat rigid for some reason. If the minute pressure decreases, other dangers may be indicated. For example, if the patient is connected to the ventilator by means of a tracheotomy tube, a decrease in minute pressure may indicate a leak in the connection.

Two of the monitors 10 may be used simultaneously, one used to collect the patient's expirations and measure his minute ventilation (or ventilation over some other period of time) and the other used to measure his minute pressure (or pressure over some other period of time). In this way, the pressure and the ventilation can be monitored simultaneously. If the pressure increases without a corresponding increase in ventilation or if the pressure increases and the ventilation decreases, a problem is indicated.

The cross pipe 58 of the manifold 57 is provided with a safety exhaust 97 which will open the breathing circuit in the event of electrical failure and allow the patient to breathe normally. The safety is designed to be open when the power supply to the monitor is not on and closed when the power supply is on. In case of power failure the patient will not be breating into a closed system which will interfere with respiration.

Figure 12:
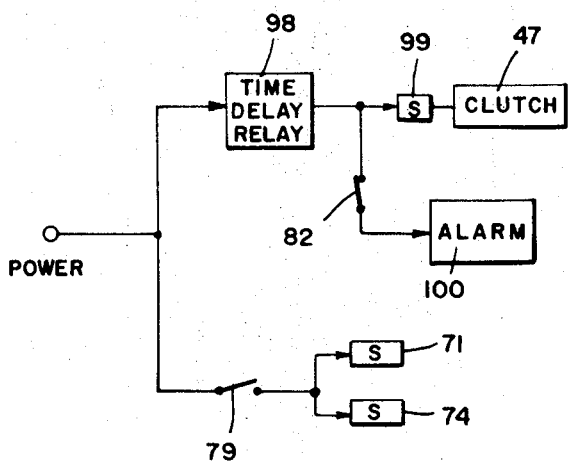
FIG. 12 is a circuit diagram for the apparatus.

A suitable circuit for use with the monitor is schematically illustrated in FIG. 12. The time delay relay 98 energizes solenoid 99 which disengages the clutch 47 at the desired frequency, and, if the switch 82 is not opened before the output of the time delay relay, the alarm 100 will be energized. If the stylus 20 passes above the minimum ventilation line 56, the switch 82 will be opened, and the output of the time delay relay will be cut off from the alarm. If the monitor is used to record pressure, then the switch 82 will be set to be closed when the stylus 20 passes above the maximum pressure line 56'. The switch 79 controls the operation of the solenoids 71 and 74.

While I have described the means for recording the movement of the bellows 16 and 17 as utilizing a rack, pinions, and gears, it is to be understood that those terms are not meant to be limited to geared elements, as other means may be used for translating the reciprocating movement of the bellows into rotary movement of the main shaft. For example, the rack 35 may be provided with flat surfaces which frictionally engage the pinions 37 and 38, which may be rollers. Similarly, the gears 42 and 43 may be frictionally engaged, smooth-surfaced rollers.

While in the foregoing specification, I have described detail embodiments of my invention in considerable detail for the purpose of explanation, it is to be understood that many of the details hereingiven may be varied considerably by those skilled in the art without departing from the spirit and scope of the invention.

I claim:

1. A pulmonary monitoring apparatus comprising a frame, a pair of bellows mounted in said frame, said bellows being operatively connected so that each bellows contracts as the other expands, air intake means adapted to communicate with the lungs of a person to be monitored, valve means for selectively directing air from said air intake means into one or the other of said bellows, and recording means for plotting movement of said bellows.

2. The apparatus of claim 1 including switch means associated with said bellows and said valve means, the position of said switch means being changed when each of said bellows expands a predetermined amount whereby said valve means cuts off air flow into the expanded bellows and directs air into the contracted bellows.

3. The apparatus of claim 2 wherein each of said bellows includes a fixed end plate and a movable end plate and each bellows expands in a direction opposite to but aligned with the direction of expansion of the other bellows, said switch means including an elongated rod connected to at least one of said movable end plates for movement therewith, said rod extending in the direction of bellows movement, a two-way switch on said frame, means carried by said rod for opening said switch when one of said bellows expands a predetermined amount and means carried by said rod for closing said switch when the other of said bellows expands a predetermined amount.

4. The apparatus of claim 1 wherein each of said bellows includes a fixed end plate and a movable end plate and each bellows expands in a direction opposite to but aligned with the direction of expansion of the other bellows, said recording means including an elongated rack connected to at least one of said movable end plates for movement therewith, said rack extending in the direction of bellows movement, first and second shafts, first and second pinions engaging said rack, linear movement of said rack causing rotational movement of said pinions, a first gear on said first shaft and a second gear on said second shaft meshing with said first gear, said first gear being fixed for rotation with said first shaft, clutch means on each of said shafts, the first shaft clutch means operatively connecting said first pinion and said first shaft for rotating said first shaft when said rack moves in one direction and operatively disconnecting said first pinion and said first shaft when said rack moves in the other direction, the second shaft clutch means operatively connecting said second pinion and said second gear when said rack moves in said other direction for rotating said second gear and operatively disconnecting said second pinion and said second gear when said rack moves in said one direction, whereby said first shaft is always rotated in the same direction by movement of said rack in either direction, stylus means, and means connecting said stylus means and said first shaft for translating rotational movement of said first shaft into linear movement of said stylus means.

5. The apparatus of claim 4 wherein said first pinion is rotatably carried by said first shaft, said first shaft clutch means including a helically wound spring carried by said first shaft between said first pinion and said first gear which is tightened by movement of said rack in said one direction, at least one of said second pinion and said second gear being rotatably carried by said second shaft, said second shaft clutch means including a helically wound spring carried by said second shaft between said second pinion and said second gear which is tightened by movement of said rack in said other direction.

6. The apparatus of claim 1 including a first intake conduit connecting said air intake means to one of said bellows, a second air intake conduit connecting said air intake means to the other of said bellows, a first valve between said first intake conduit and said air intake means, a second valve between said second intake conduit and said air intake means, two-position switch means operatively associated with said first and second valves, said first valve permitting air flow from said air intake means to said first intake conduit but preventing air flow in the opposite direction when said switch is in one position, said first valve preventing air flow in either direction when said switch is in the other position, said second valve permitting air flow from said air intake means to said second intake conduit but preventing air flow in the opposite direction when said valve is in the other position, said second valve preventing air flow in either direction when said switch is in said one position.

7. The apparatus of claim 6 including exhaust means for each of said bellows, means for closing the exhaust means of said first bellows when said switch is in said one position, and means for closing the exhaust means of said second bellows when said switch is in the other position.

8. A pulmonary monitoring apparatus comprising:
a. a frame;
b. a pair of bellows mounted in said frame, each of said bellows including a fixed end plate and a movable end plate and expandable in a direction opposite to but aligned with the direction of expansion of the other bellows;
c. air intake means adapted to communicate with the lungs of a person to be monitored;
d. valve means for selectively directing air from said air intake means into one or the other of said bellows;
e. an elongated rack connected to at least one of said movable end plates for movement therewith, said rack extending in the direction of bellows movement;
f. a main shaft rotatably supported by said frame;
g. means operatively connecting said main shaft to said rack for rotating said main shaft in a constant direction as said rack moves with said bellows;
h. recording means;
i. stylus means for scribing said recording means; and
j. means connecting said stylus means and said main shaft for translating rotational movement of said main shaft into linear movement of said stylus means.

9. The apparatus of claim 8 in which said stylus means is connected to said main shaft by a pulley carried by said shaft and a drive band looped about said pulley, said stylus being moved linearly by said band from a reference position, clutch means on said main shaft, said clutch means being engageable with said pulley to rotate said pulley with said main shaft, rewind means connected to said pulley, said rewind means rotating said pulley to return said stylus means to said reference position when said clutch means is disengaged from said pulley.

10. The apparatus of claim 9 including time delay relay means for disengaging said clutch means at selected time intervals.

11. The apparatus of claim 8 including a first intake conduit connecting said air intake means to one of said bellows, a second air intake conduit connecting said air intake means to the other of said bellows, a first valve between said first intake conduit and said air intake means, a second valve between said second intake conduit and said air intake means, a two-position switch on said frame, the position of said switch being changed when each of said bellows expands a predetermined amount, said switch being operatively associated with said first and second valves, said first valve permitting air flow from said air intake means to said first intake conduit but preventing air flow in the opposite direction when said switch is in one position, said first valve preventing air flow in either direction when said switch is in the other position, said second valve permitting air flow from said air intake means to said second intake conduit but preventing air flow in the opposite direction when said valve is in the other position, said second valve preventing air flow in either direction when said switch is in said one position.

12. The apparatus of claim 11 including an elongated rod connected to at least one of said movable end plates for movement therewith, said rod extending in the direction of bellows movement, means carried by said rod for opening said switch when one of said bellows expands a predetermined amount and means carried by said rod for closing said switch when the other of said bellows expands a predetermined amount.

13. The apparatus of claim 8 wherein the means connecting said main shaft to said rack includes a first pinion rotatably carried by said main shaft, a second shaft rotatably supported a fixed distance from said main shaft, a second pinion carried by said second shaft, a first gear on said main shaft fixed for rotation with said shaft, a second gear on said second shaft meshing with said first gear, at least one of said second pinion and said second gear being fixed for rotation with said second shaft, first clutch means on said main shaft for operatively connecting said first pinion and said main shaft for rotating said main shaft when said rack moves in one direction and operatively disconnecting said first pinion and said main shaft when said rack moves in the other direction, second clutch means on said second shaft for operatively connecting said second pinion and said second gear when said rack moves in said other direction for rotating said second gear and operatively disconnecting said second pinion and said second gear when said rack moves in said one direction.

14. The apparatus of claim 13 wherein said main shaft includes a radially enlarged portion between said first pinion and said first gear, said pinion including a hub having a diameter approximately equal to the diameter of said main shaft enlarged portion, said main shaft clutch means including a helically wound spring carried by said main shaft between said first pinion and said first gear, whereby rotation of said pinion as said rack moves in said one direction tightens said spring about said first pinion hub and said shaft enlarged portion, said second shaft including a radially enlarged portion between said second pinion and said second gear, at least one of said second pinion and said second gear including a hub having a diameter approximately equal to the diameter of said second shaft enlarged portion, said second shaft clutch means including a helically wound spring carried by said second shaft between said second pinion and said second gear, said second shaft clutch spring being tightened by rotation of said second pinion as said rack moves in said other direction.

15. The apparatus of claim 8 including switch means associated with said stylus means, a predetermined linear movement of said stylus means activating said switch means, and alarm means operatively connected to said switch means.